May 13, 1930.  F. G. HUGHES  1,758,667
BEARING MOUNTING
Filed May 16, 1924
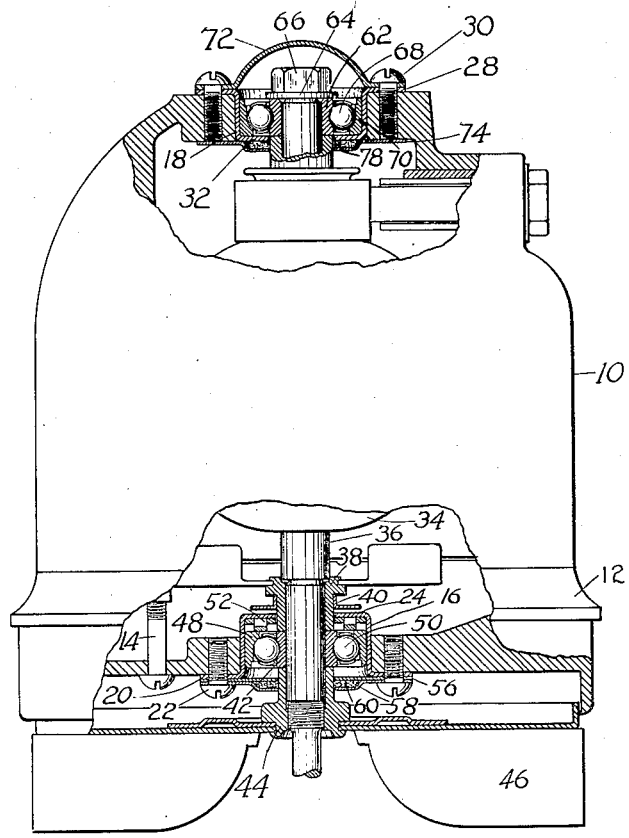
Fig.1
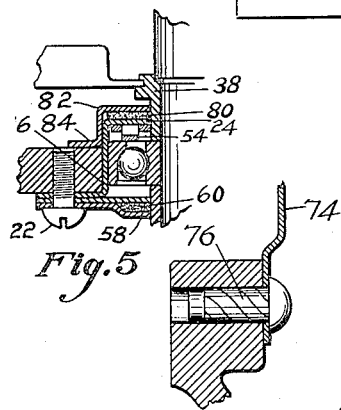
Fig.5
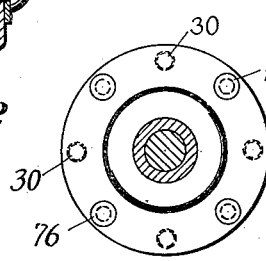
Fig.2
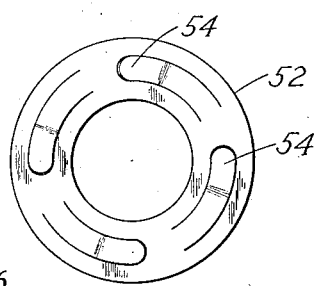
Fig.3
Fig.4
Inventor:
Frederick G. Hughes,
by
his Attorney.

Patented May 13, 1930

1,758,667

UNITED STATES PATENT OFFICE

FREDERICK G. HUGHES, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

BEARING MOUNTING

Application filed May 16, 1924. Serial No. 713,747.

This invention relates to bearing mountings and is herein shown as embodied in a ball bearing mounting for the armature shaft of an electric motor.

One of the objects of the invention is to provide an improved bearing mounting in which the armature shaft is held against all radial movement even if it does not operate in a permanent plane. Another object is to provide an improved mounting in which the rolling elements will constantly be pressed against their races in spite of slight longitudinal movement or expansion of the shaft. Another object is to provide improved means which will automatically compensate for wear of the rolling elements or their races.

To these ends and also to improve generally upon devices of the character indicated my invention consists in the various matters hereinafter described and claimed.

Referring to the drawings, Figure 1 is a front view partly broken away and in section.

Figure 2 is a sectional view of a detail.

Figure 3 is an enlarged front view of the spring member.

Figure 4 is a section above the commutator.

Figure 5 is a detail section of a modification.

The numeral 10 indicates the main portion of a motor casing having an end bell 12 detachably secured to the main portion by screws 14. The ends of the casing have aligned bores in which are closely fitted pressed metal cups or bearing retainers 16 and 18 respectively. The lower cup 16 has a cylindrical body portion and an outwardly extending attaching flange 20 fastened by screws 22 to the end bell. The bottom 24 of the cup is formed by an inwardly extending flange surrounding the armature shaft. The upper cup 18 has an outwardly extending attaching flange 28 fastened to the outer end of the housing by screws 30 and the bottom 32 of the cup is formed by an inwardly extending flange surounding the armature shaft.

An armature is indicated at 34 and its shaft at 36. Fixed to a reduced portion of the shaft, is the hub 38 of a fan or other means for furnishing a circulation of air within the motor casing to cool the motor. Fitting on the hub 38, is a flanged ring or slinger 40 to prevent dust particles from working into the lower cup and its bearing. An inner race ring 42 is secured on the shaft by a threaded member 44, herein shown as a hub which carries fan blades 46 of a vacuum cleaner. An outer race ring 48 of the angular contact type fits the body portion of the cup and is arranged to slide therein, balls 50 being interposed between the inner and outer race rings. A ring 52, having punched out portions forming resilient tongues 54, is interposed between the bottom 24 of the cup and the outer race ring 48. Hence, any movement of the inner race ring 42 with the part of the shaft to which it is attached, cannot cause any looseness in the bearing because the spring tongues 54 will press the outer race ring 48 downwardly and keep the balls pressed against their races at all times. A washer 56 extends across the open end of the cup and a second washer 58, which is dished at the center, is arranged outside the first washer and holds a ring 60 of absorbent material which makes a close joint with the hub 44 to exclude dust from the housing or cup and retain lubricant therein. The washers are held to the end bell by the same screws 20 which hold the cup, and the ring 60 of absorbent material is compressed somewhat between the washers to make it press continually against the hub 44.

An inner race ring 62 is secured to the upper end of the shaft by a washer 64 and a nut 66 threaded on the armature shaft. Balls 68 are interposed between the inner race ring and an outer race ring 70 of the angular contact type, said outer ring resting against the bottom 32 of the cup. The open end of the cup is closed by a detachable cap 72 fastened to the end of the casing by the same screws 30 which secure the cup in place. Inside of the motor casing, below the cup, is a dished washer 74 of the same size and shape as the washer 58 at the lower bearing. This washer is secured in place by drive screws 76 and encloses and presses a ring 78 of absorbent material against the bottom 32 of the cup and against a sleeve that rotates with the shaft. Thus lubricant in the upper housing is prevented from working downwardly to the commutator, and dust and other extraneous matter is excluded from the bearing.

In Figure 5, access of foreign matter to the bearing, from inside the motor casing, is prevented by a ring 80 of felt or the like which is held between the bottom 24 of the cup 16 and the bottom of a cup 82 which surrounds the hub 38. The cup 82 has its body portion of an interior size to fit the outside of the cup 16 and an annular flange 84 at the open end bears against an inner face of the end bell and may be attached to it in any suitable way.

It should be noted that the outer race rings have their thicker portions arranged towards the bottoms of the cups and that their thrust faces face away from each other. The side walls of the grooves in the inner race rings hold the balls from movement axially with respect to these inner race rings. When the shaft is out of the horizontal, the weight of the armature and shaft is transmitted through the balls 68 from the upper side of the grove in the inner race ring 62 to the thrust face of the outer race ring 70 and then to the inwardly extending flange 32 of the cup, the cup in turn being firmly supported on the casing by its outwardly extending flange 28. No weight comes on the spring tongues 54 which are always effective to press the lower, outer race ring 48 downwardly to prevent play and wear in the bearings.

Although the invention has been described by reference to a specific construction, it should be understood that, in its broader aspects, it is not necessarily limited to the precise details selected for illustrative purposes.

I claim:

In a machine having a shaft adapted to operate in a position out of the horizontal, a casing having upper and lower bores arranged in axial alignment and surrounding portions of the shaft, inner grooved race rings fixed to the portions of the shaft within the bores, series of balls held by the sides of the grooves from movement axially with respect to their inner race rings, an outer race ring on each series of balls, the outer race ring of the upper bearing having a thrust face facing upwardly and supporting the balls and the weight of the shaft, a pressed metal cup fitting in the upper bore of the casing and having an inwardly extending bearing supporting flange extending under and in contact with the lower end of the corresponding outer race ring, the cup having an outwardly extending supporting flange overlapping and secured to the upper end face of the casing to support the cup in the bore, a cup fitting in the lower bore and slidable receiving the other outer race ring, the lower cup having an inwardly extending flange at its upper end and an outwardly extending flange overlapping and secured to the lower end face of the casing, and a spring supported by the slidable outer race ring and engaging the inwardly extending flange of its cup; substantially as described.

In testimony whereof I hereunto affix my signature.

FREDERICK G. HUGHES.